(12) United States Patent
Noda et al.

(10) Patent No.: US 6,701,267 B2
(45) Date of Patent: Mar. 2, 2004

(54) METHOD FOR CALIBRATING PROBE AND COMPUTER-READABLE MEDIUM

(75) Inventors: Takashi Noda, Kawasaki (JP); Kozo Sugita, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 11 days.

(21) Appl. No.: 10/264,626

(22) Filed: Oct. 4, 2002

(65) Prior Publication Data

US 2003/0069708 A1 Apr. 10, 2003

(30) Foreign Application Priority Data

Oct. 4, 2001 (JP) ........................................ 2001-309122

(51) Int. Cl.[7] ........................ G01C 17/38; G01P 21/00; G01F 19/00
(52) U.S. Cl. ........................ 702/95; 702/94; 702/104; 33/503; 33/559
(58) Field of Search ................. 702/104, 94, 95; 33/503, 559

(56) References Cited

U.S. PATENT DOCUMENTS

| | | | | |
|---|---|---|---|---|
| 4,819,195 A | * | 4/1989 | Bell et al. ........................ | 702/95 |
| 4,945,501 A | * | 7/1990 | Bell et al. ........................ | 702/95 |
| 5,125,261 A | * | 6/1992 | Powley ........................... | 73/1.81 |
| 5,649,368 A | * | 7/1997 | Herzog et al. ................... | 33/502 |
| 5,665,896 A | * | 9/1997 | McMurtry ....................... | 73/1.75 |
| 5,953,687 A | * | 9/1999 | Zink et al. ....................... | 702/168 |
| 6,199,024 B1 | * | 3/2001 | Bunimovich et al. ............ | 702/95 |

FOREIGN PATENT DOCUMENTS

| | | | | |
|---|---|---|---|---|
| JP | | 07-146130 | 6/1995 | |
| JP | | 07146130 A | * 6/1995 | ........... G01B/21/00 |

* cited by examiner

*Primary Examiner*—John Barlow
*Assistant Examiner*—Anthony T. Dougherty
(74) *Attorney, Agent, or Firm*—Rankin, Hill, Porter & Clark LLP

(57) ABSTRACT

A calibration reference work sphere is measured to obtain measured values by using a probe vector given before updating is made by exchanging the probe for a new one or by changing the posture of the probe. Then, the measured values are error-corrected by using the probe vector given before updating to thereby obtain the coordinates of the center of the reference sphere. The difference between the obtained coordinates and the coordinates of the center of the reference sphere before updating of the probe is obtained to thereby calculate a predicted probe vector. A calibration measurement part program for measuring the calibration reference sphere by using the predicted probe vector is generated and executed for performing calibration measurement. A calibration value of the probe vector is calculated on the basis of the result of the calibration measurement.

5 Claims, 6 Drawing Sheets

METHOD FOR CALIBRATING PROBE AND COMPUTER-READABLE MEDIUM

BACKGROUND OF THE INVENTION

1. Field of the Invention

A present invention relates to a method for calibrating a probe and a computer-readable medium therefore, and more relates to a method for calibrating error of a scanning probe measuring surface texture such as size, shape, waviness, roughness, etc. of a work by scanning or error of a touch signal probe, and to a computer-readable medium for the calibration method.

2. Description of the Related Art

There are known surface texture measuring machines for measuring a contour shape, roughness, waviness, etc. of a surface of a work, such as a coordinate measuring machine (Hereinafter, referred to CMM) for measuring the three-dimensional shape of a work, a contour shape measuring machine or vision measuring machine for measuring the two-dimensional contour shape of a work, a roundness measuring machine for measuring the roundness of a work, a surface roughness tester for measuring the waviness, roughness, etc. of a surface of a work, and so on. In most cases, each of these machines has a uniaxial or multiaxial guide mechanism for moving the work relatively to a contact type or non-contact type sensor.

The guide mechanism has a guide, a feed screw, and a nut thread-engaged with the feed screw. The guide mechanism moves a slider connected to the nut. In most cases, the movement of the slider is measured with a linear scale or the like.

The guide mechanism need not have a feed screw. That is, the guide mechanism may have a guide, and a slider, in which the displacement quantity of the slider moved manually is read by a linear scale or the like. Generally, at least one kind of sensor such as a probe or a CCD camera is attached to the slider. Probes used for these applications are classified into touch signal probes and scanning probes.

FIG. 6 shows an example of use of a scanning probe 118 attached to a forward end of a spindle 117 in CMM 100.

The CMM 100 is configured as follows. A measuring table 112 is placed on a vibration isolating stand 111 so that an upper surface of the measuring table 112 forms a base plane coincident with a horizontal plane. A beam 114 extended in an X-axis direction is supported at upper ends of beam supports 113a and 113b erected from opposite side ends of the measuring table 112. A lower end of the beam support 113a is driven in a Y-axis direction by a Y-axis drive mechanism 115. A lower end of the beam support 113b is supported by an air bearing so that the beam support 113b can move in the Y-axis direction relatively to the measuring table 112. The current position of the moved beam supports 113a and 113b is detected by a Y-axis scale 245.

The beam 114 supports a column 116 extended in a vertical direction (Z-axis direction). The column 116 is driven along the beam 114 in the X-axis direction. The current position of the moved column 116 is detected by an X-axis scale 244. The column 116 is provided with the spindle 117 so that the spindle 117 is driven along the column 116 in the Z-axis direction. The current position of the moved spindle 117 is detected by a Z-axis scale 246.

The scanning probe 118 having a contact type stylus 119 and a contact ball 121 is attached to a lower end of the spindle 117. The probe 118 measures a work placed on the measuring table 112. For example, an optical linear scale or the like is used as each of the X-axis scale 244, the Y-axis scale 245 and the Z-axis scale 246.

Any kind of probe such as a contact type probe or a non-contact type probe is used as the probe. A touch signal probe which is a typical example of the contact type probe obtains the measurement position of the work by reading the values of various kinds of linear scales at the moment that the measurer comes into contact with the work.

JP-A-10-73429 is known as an example of the touch signal probe. The touch signal probe has a structure in which a measurer having a spherical contactor at its tip can be always restored to a home position by a seating mechanism. When the contactor comes into contact with a work, the measurer is displaced so as to depart from the seating mechanism and at the same time that electric contact is opened to output a touch signal.

The touch signal probe is basically provided to obtain the coordinates of a point on the work. To measure a plurality of points on the work, a measuring operation is required whenever one of the points is measured. When, for example, contour data of a work needs to be obtained densely, the total measurement time becomes long because a lot of positioning and measuring operations are required. As a result, the touch signal probe is influenced by the environmental change such as temperature change. Hence, the touch signal probe is not always adapted for high-accuracy measurement.

On the other hand, the scanning probe can measure the position of a work continuously. Hence, contour data can be obtained densely, speedily and easily because a plurality of points on the work can be measured. Hence, the scanning probe is hardly influenced by the environmental change, so that there is the possibility that the scanning probe performs high-accuracy measurement as a whole.

Such a scanning probe has been described in JP-A-5-256640. The probe is formed so that a stylus is supported through an X-axis slider, a Y-axis slider and a Z-axis slider which are movable in respective directions orthogonal to a pedestal.

Slide portions between the pedestal and the three sliders are supplied with compressed air to form air bearings. Hence, a frictionless guide mechanism is formed.

The guide mechanism further includes three sensors, that is, a Z-axis sensor for detecting the displacement of the Z-axis slider relative to the pedestal, a Y-axis sensor for detecting the displacement of the Y-axis slider relative to the Z-axis slider and an X-axis sensor for detecting the displacement of the X-axis slider relative to the Y-axis slider.

The three-dimensional displacement quantity of the stylus can be measured with the three sensors.

For example, an absolute optical linear scale is used as each of the sensors. When the scanning probe is moved relatively to a work in a direction of a surface of the work while the measure (hereinafter, referred to a stylus) of the scanning probe is kept in contact with the surface of the work, the stylus is displaced along the contour shape of the surface of the work. Hence, contour shape data of the work can be collected continuously.

In this case, the values of the linear scales measuring displacement of the drive mechanisms of the CMM are synthesized with the three sensor outputs from the scanning probe to thereby obtain the contour shape data. Incidentally, when the stylus is not in contact with the work, the ordinary stop positions (restored positions) of the X-axis slider, the Y-axis slider and the Z-axis slider in the scanning probe are set as the origin positions of the absolute sensors respectively.

As shown in FIG. 6 which is a block diagram, an X-axis sensor 251, a Y-axis sensor 252 and a Z-axis sensor 253 are built into the scanning probe 118. The sensors 251 to 253 output the quantities of displacement of the scanning probe 118 in accordance with the displacement of the stylus 119 in the X-axis, Y-axis and Z-axis directions respectively.

A drive unit 260 has an X-axis drive circuit 261 for driving an X-axis drive mechanism 105, a Y-axis drive circuit 262 for driving the Y-axis drive mechanism 115, a Z-axis drive circuit 263 for driving a Z-axis drive mechanism 125, an X-axis counter 264 for counting the output of the X-axis scale 244, a Y-axis counter 265 for counting the output of the Y-axis scale 245, a Z-axis counter 266 for counting the output of the Y-axis scale 246, an X-axis P counter 267 for counting the output of the X-axis sensor 251, a Y-axis P counter 268 for counting the output of the Y-axis sensor 252, and a Z-axis P counter 269 for counting the output of the Z-axis sensor 253. The respective constituent members of the drive unit 260 are connected to a computer 270.

Hence, each of the X, Y and Z axes in the CMM 100 can be positioned in any arbitrary position at any arbitrary speed on the basis of an instruction given from the computer 270. Further, the computer 270 is formed so that the current position of the spindle 217 in the X, Y and Z axes and the current displacement of the stylus 119 of the scanning probe 118 can be found when the respective count values of the counters 264 to 269 are input to the computer 270.

The computer 270 has a connection unit not shown but for exchanging information with the drive unit 260. Other constituent requirements for the computer 270 are the same as those for a known computer. That is, the computer 270 has a central processing unit, a storage device, an input device, a display device, a printing device, and an output device. Further, the constitutive processes for the CMM 100 may be automatically controlled by a program stored in the storage device or each of functions of these constitutive processes may be semi-automatically or manually controlled as occasion demands.

The constitutive processes for constituting the CMM 100 include error compensation of the CMM 100, collection of scanning probe data, calculation of error, display of error, functionalization of error, output of correction data, and so on.

Generally, information exchange between the computer 270 and the drive unit 260 is performed by wire communication through a transmission control procedure such as IEEE488. Alternatively, wireless communication, optical communication or the like may be used as occasion demands.

No matter which type of the probe is used, the offset (probe vector) from the reference position of the probe (generally, a lower end of a spindle 117) to the measurement point (the center of the contact ball 121) has a value peculiar to the probe.

On the other hand, parallel errors (each axis scale error, each axis horizontal straightness error and each axis vertical straightness error) and rotational errors (each axis pitching error, each axis yawing error, each axis rolling error and each inter-axis orthogonal error) occur in the CMM as described in Japanese Patent No. 2,902,285. Each of these errors is expressed by an error compensation function f of a count output (an output of each of axis counters 264, 265 and 266) of each of axis scales 244, 245 and 246 and a probe vector P. Hence, the coordinate vector x' of the measurement point (the center of the contact ball 121) after error compensation is given by the expression:

$$x'=x+f(x,P) \qquad (1)$$

in which x is a vector indicating a count output before correction, and P is a probe vector.

The probe vector P is a cause of error mainly because of the influence of rotational error of sliders in the CMM itself.

If error compensation due to the error compensation function f is incorporated in a position control loop of each of axes in the CMM, the probe can be moved to an accurate target point after error compensation by a simple operation of instructing a moving target point to the position control loop. Further, since correction is made at every moment, accurate locus control can be performed even in the case where contour control is required.

The error compensation function f maybe however complex so that a long time is taken to calculate the error compensation function f and f transformation processing cannot be therefore performed in the position control loop. In such a case, as described in Japanese Patent No. 2,798,873, an error compensation inverse function $f^{-1}$ maybe arranged in the outside of the control loop. According to this arrangement, the moving target point is given to the control loop after the moving target point is transformed into a point in a kinetic coordinate system of the CMM including error by the error compensation inverse function $f^{-1}$. Hence, it is unnecessary to perform error compensation in the control loop, so that high-speed processing can be made.

$$x=x'-f^{-1}(x', P) \qquad (2)$$

As described above, the probe vector P gives an offset from the reference position of the spindle to the position of the center of the contact ball 121 at a tip of the measurer. When the probe vector is also used for a new probe for which the probe is exchanged or the probe having its posture changed, one part program can be used in common to different probes or different probe postures. In addition, error compensation can be also performed accurately.

As described above, it is necessary to obtain the probe vector P by calibration whenever the probe is exchanged for a new one or whenever the posture of the probe is changed. As shown in FIG. 7 which is a flow chart, these calibrating works are generally made as follows.

(a) When the probe 118 attached to the tip of the spindle 117 in the CMM is exchanged for a new one or when the posture of the probe 118 is changed, updating is performed. Further, calibration information such as the probe vector P0 before updating and the radius of the reference sphere is input to the computer 270 (step 320).

(b) Four or more points on the reference sphere 120 are manually preparatorily measured with the probe 118. Then, the coordinates of a first center of the reference sphere 120 are calculated on the basis of the coordinates of the measurement points. For example, one arctic point (in a top portion) and four equatorial points on the reference sphere are selected as the measurement points (step 330).

(c) A part program for measuring the reference sphere at points is generated by using the coordinates of the first center of the reference sphere 120, the radius (known) of the reference sphere and the probe vector P0. On this occasion, about five points are selected as the measurement points (although the measurement may be performed manually, automatic measurement by use of a generated part program is generally performed because the measurement result in the manual measurement deviates largely.) (step 340).

(d) The part program for measuring the reference sphere at points is executed to obtain the coordinates of the measurement points. The coordinates of a second center of the reference sphere 120 (more accurate than the coordinates obtained in the step 330) are obtained on the basis of the coordinates of the measurement points. At the same time, the quantity of shift from the coordinates C0 of the center of the reference sphere measured by using a temporary probe vector P (that is, from the coordinates of the center measured of the reference sphere before updating of the probe) is calculated to thereby obtain a new probe vector P (step 350).

The calibrating steps (a) to (d) need to be carried out whenever the probe is exchanged for a new one or whenever the attachment posture of the probe is changed. Moreover, since the greatest care such as thorough temperature control is required for performing the calibrating steps, even a skillful calibrating person takes a large amount of time to perform these calibration works, however, with the result that it is still impossible to always obtain sufficient calibration accuracy.

Moreover, as described above, the coordinates indicated by the CMM include error caused by the probe vector P. It is therefore necessary to obtain a new correct probe vector P when the posture of the probe attached to the spindle is changed or when the probe is exchanged for a different one. On the other hand, since the new probe vector P is unknown, error compensation cannot be performed correctly after the change of the posture. Hence, the correct coordinates of the measurement points cannot be obtained. As a result, there is a problem that the new correct probe vector P cannot be obtained.

Measures against this problem have been proposed in Japanese Patent No. 2,902,285. In the system, the old probe vector given before the change of the posture of the probe is however used for measuring the reference sphere after the posture of the probe is changed. On the basis of results thereof, the coordinates of the center of the reference sphere are calculated. Further, when a new probe vector is calculated by using the difference between the coordinates of the reference sphere calculated thus and the coordinates of the center of the reference sphere measured before the change of the posture of the probe, correction is made gradually so that error of the coordinates of the reference sphere measured by use of the old probe vector after the change of the posture of the probe is in an allowable range in order to prevent the influence of the error of the CMM itself.

On the other hand, with the increase in size of the CMM in recent years, there is a tendency that reduction in the cost of the CMM attained by using an error compensation technique to correct the error of the CMM has been desired than assurance of error reduction of CMM attained by processing accuracy. As a result, while the error of the CMM itself has been enlarged, requirement for measurement accuracy has become stricter. In such a case, the correction system according to Japanese Patent No. 2,902,285 maybe not always sufficient in terms of accuracy.

SUMMARY OF THE INVENTION

It is an object of the invention to provide a method for calibrating a probe by calibrating a probe vector with higher accuracy without increasing any time or labor for the calibration and to provide a computer-readable medium for the calibration method.

To achieve the foregoing object, according to the invention, there is provided a method of calibrating a probe by calibrating a probe vector indicating an offset of a measurer of the probe, including:

a step of updating the probe measuring a work by exchanging the probe for a new one or by changing the posture of the probe;

a preparatory measuring step of measuring a calibration reference work by using a probe vector before updating to thereby obtain measured values;

a probe vector predicting step of predicting a probe vector on the basis of a result of error compensation transformation using the measured values obtained by the preparatory measuring step and the probe vector given before updating of the probe;

a calibration measuring step of generating a part program for measuring the calibration reference work by using the predicted probe vector and executing the part program; and a probe vector calibrating step of calculating a calibration value of the probe vector on the basis of results measured by the calibration measuring step.

According to the invention, the probe vector after exchange of the probe for a new one or after change of the posture of the probe can be predicted on the basis of the results of manual measurement of the probe vector before exchange of the probe for a new one or before change of the posture of the probe and the reference sphere, while error peculiar to the CMM or the like is avoided by error compensation. Calibration measurement can be preformed by using the predicted probe vector. Hence, more accurate calibration measurement can be performed. Hence, the resulting calibration value of the probe vector after exchange of the probe for a new one or after change of the posture of the probe can be improved more greatly in accuracy.

Preferably, the method of calibrating a probe according to the invention further includes: the repetition judging step of judging whether the probe vector predicting step is to be repeatedly executed or not; and the step of replacing the probe vector before updating by the probe vector predicted by the previous probe vector predicting step and executing the probe vector predicting step when a decision is made in the repetition judging step that the number of times of repetition is smaller than a predetermined number.

In this configuration, the probe vector predicting step can be repeatedly executed. In the repetition, the probe vector before updating is replaced by the probe vector (latest calculation result) predicted by the previous probe vector predicting step. Hence, in the probe vector predicting step to be executed next, the measured values obtained by the preparatory measuring step are corrected by error compensation transformation on the basis of the predicted probe vector as the latest calculation result. Hence, because the predicted probe vector approaches the true value, accuracy in the results of error compensation transformation is also improved. As a result, the predicted probe vector re-calculated approaches the true value more greatly.

In this manner, the predicted probe vector approaches the true value whenever the probe vector predicting step is repeatedly executed. In practice, it is however experimentally confirmed that sufficient accuracy can be obtained by once or twice repetition.

In this manner, in prediction of the probe vector, it is easier to avoid error peculiar to the CMM. Because accuracy in the predicted value of the probe vector used for calibration measurement is improved more greatly, more accurate calibration measurement can be performed. Hence, accuracy in the calibration value of the probe vector after exchange of the probe for a new one or after change of the posture of the probe as a result of calibration measurement is improved more greatly.

Preferably, the method for calibrating a probe according to the invention further includes the step of performing error compensation inverse transformation on the result of the error compensation transformation in the previous probe vector predicting step by the probe vector before both replacement and updating, and replacing the measured values by results of the error compensation inverse transformation when a decision is made in the repetition judging step that the number of times of repetition is smaller than a predetermined number.

In this configuration, when a decision is made in the repetition judgement step that the number of times of repetition is smaller than the predetermined number, results of error compensation transformation in the preceding probe vector predicting step are transformed by error compensation inverse transformation on the basis of the probe vector before both replacement and updating. The step of replacing the measured values by results of error compensation inverse transformation can be performed. As a result, in the probe vector predicting step to be executed next, calculation of the predicted probe vector can approach the true value more because the measured values have been already replaced by the latest measured values and because the probe vector has been already replaced by the latest calculation result.

Preferably, in the method of calibrating a probe according to the invention, the calibration reference work is a ball. In this configuration, the probe can be calibrated with higher accuracy by using a high-precision reference sphere easy to process.

Preferably, the method for calibrating a probe according to the invention is provided as a calibration program executed by a computer. In this configuration, for example, an inexpensive general-purpose computer can be used so that the program can be executed easily by the computer. Hence, promotion of use of the invention can be attained greatly.

DESCRIPTION OF THE PREFERRED EMBODIMENTS

Figure 1:
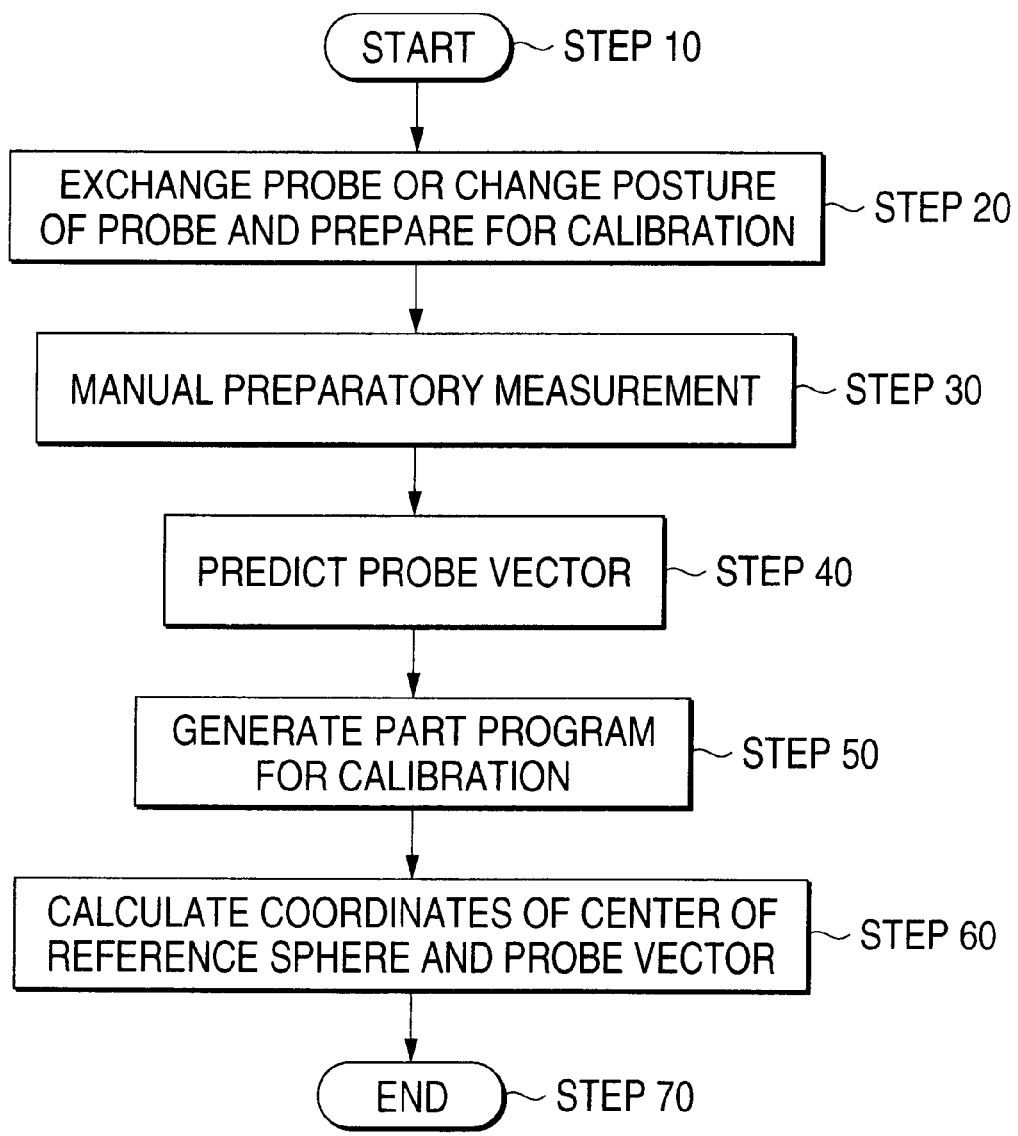
FIG. 1 is a flow chart showing a calibrating method according to a first embodiment of the invention.

Preferred embodiments of the invention will be described below with reference to the drawings. In the drawings, like numerals refer to like parts.

FIG. 1 shows a method for calibrating a probe according to a first embodiment of the invention. First, the processing starts in step 10. Then, in step 20, the probe 118 is exchanged for a new one or the posture of the probe 118 is changed. The radius (calibrated and known) of a reference sphere, a temporary probe vector P0 (probe vector before the exchange of the probe for a new one when the probe is exchanged for a new one, or probe vector before the change of the posture of the probe when the posture of the probe is changed), the coordinates C0 of the center of the reference sphere measured on the basis of the temporary probe vector P0 (coordinates of the center of the reference sphere last time or before the change of the posture of the probe) are input to a computer 270 to prepare for calibration.

Figure 4A:
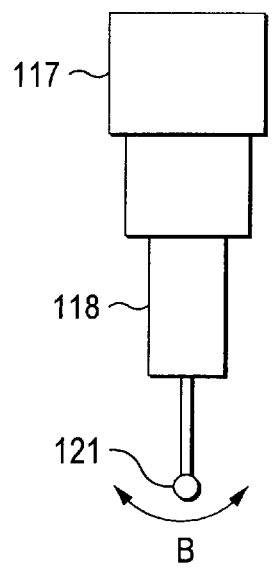
FIGS. 4A and 4B are views for explaining a calibrating method.
Figure 4B:
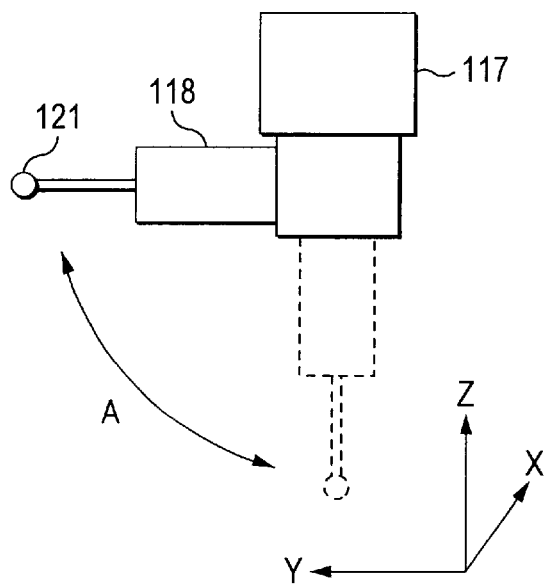
Figure 5:
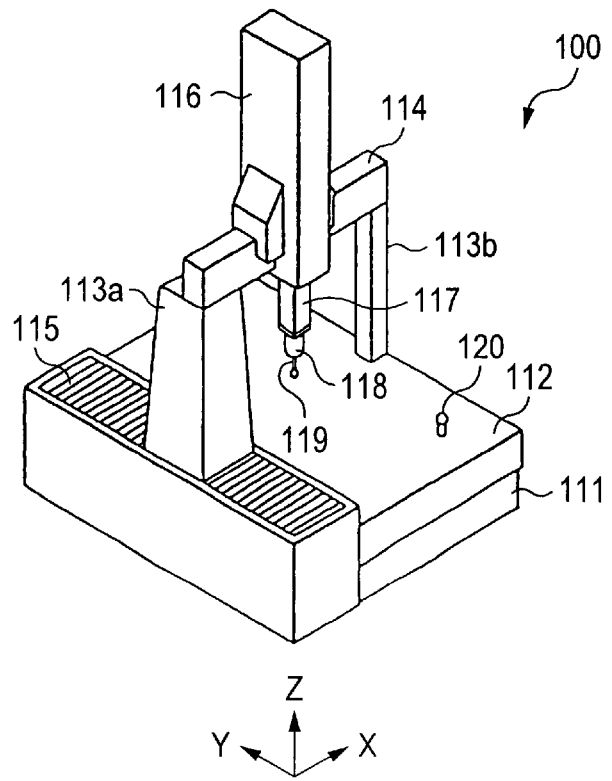
FIG. 5 is a perspective view of a coordinate measuring machine for carrying out the invention.
Figure 6:
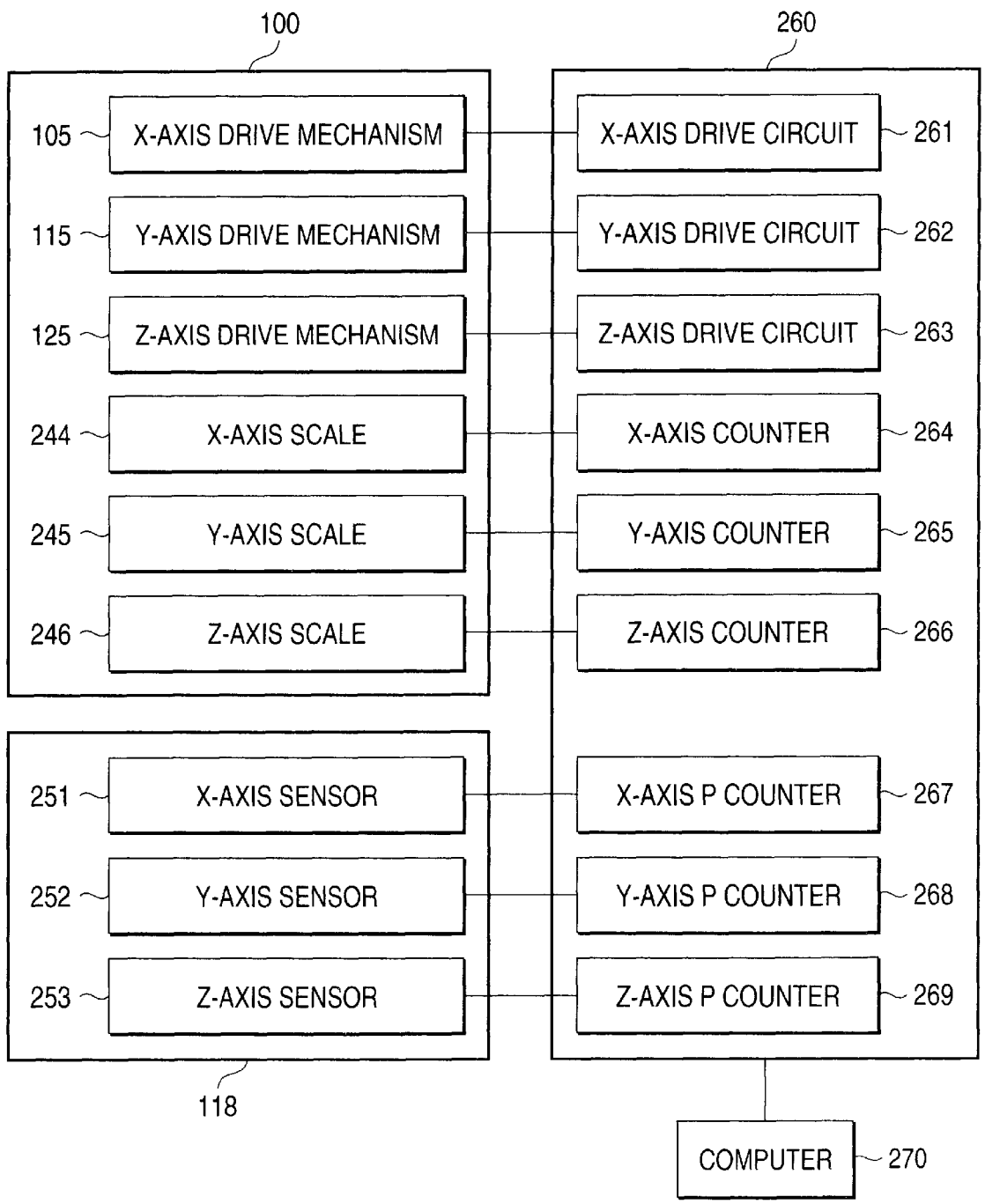
FIG. 6 is a block diagram of the three-dimensional measuring system according to the invention.
Figure 7:
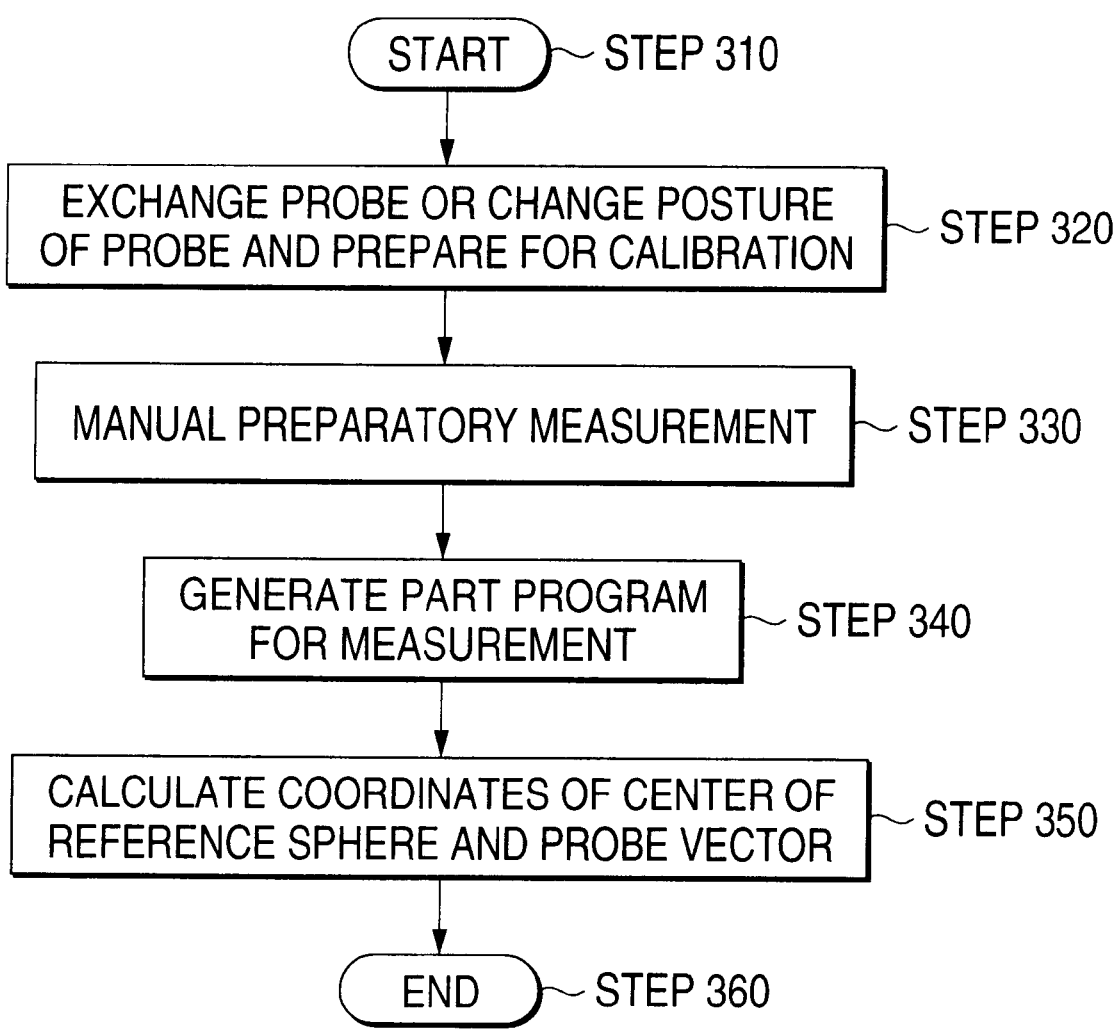
FIG. 7 is a flow chart showing a method for calibrating a probe by a conventional technique.

It is conceived that examples of change of the posture of the probe include rotation of the probe in an XY plane as shown in FIG. 4A, rotation of the probe in a YZ plane as shown in FIG. 4B, rotation of the probe in an XZ plane, and combination of these posture changes.

Then, in step 30, four or more points on the reference sphere 120 are manually preparatorily measured with the probe 118 to thereby obtain the coordinates xi (vectors i=1 to n, n>3) of the respective measurement points. For example, one arctic point and four equatorial points on the reference sphere are selected as the measurement points.

Then, in step 40, error compensation is performed by the expression (1) on the basis of the measure values (coordinates) xi of the respective measurement points measured by the step 30 and the probe vector P0 to thereby obtain corrected coordinates xi'.

$$xi'=xi+f(xi,P0) \quad (3)$$

Then, the coordinates C1' of the center of the reference sphere are calculated on the basis of the corrected coordinates xi'. Then, the probe vector P0 is corrected by the offset of the coordinates C1' of the center with respect to the coordinates C0 of the center of the reference sphere to thereby calculate a predicted probe vector P1'.

$$P1'=P0+(C1'-C0) \quad (4)$$

Then, in step 50, a calibration measurement part program for measuring the reference sphere at points is generated by using the coordinates C1' of the center of the reference sphere, the predicted probe vector P1' and the radius (known) of the reference sphere. On this occasion, about five points are used as the measurement points.

Then, in step 60, the calibration measurement part program is executed to obtain the coordinates of the measurement points. On the basis of the results thereof, the coordinates C2 (more accurate than the coordinates obtained in the step 40) of the second center of the reference sphere 120 are obtained. At the same time, the probe vector P0 is corrected by the offset of the coordinates C2 of the second center with respective to the coordinates C0 of the center of the reference sphere to thereby obtain a final probe vector P.

$$P=P0+(C2-C0) \quad (5)$$

Then, the processing is terminated in step 70.

The first embodiment shown in FIG. 1 has the following effect.

The measured values xi of the reference sphere are corrected by error peculiar to the CMM to thereby obtain corrected coordinates xi'. A predicted prove vector P1' is calculated on the basis of the coordinates C1' of the center of the reference sphere obtained on the basis of the corrected coordinates xi'. A calibration measurement part program is generated by using the predicted probe vector P1' and executed to thereby perform calibration measurement of the reference sphere. Hence, accuracy in measurement of the reference sphere by the calibration measurement part program is improved. Hence, accuracy of the final probe vector P obtained on the basis of the result of the measurement is improved more greatly.

Figure 2:
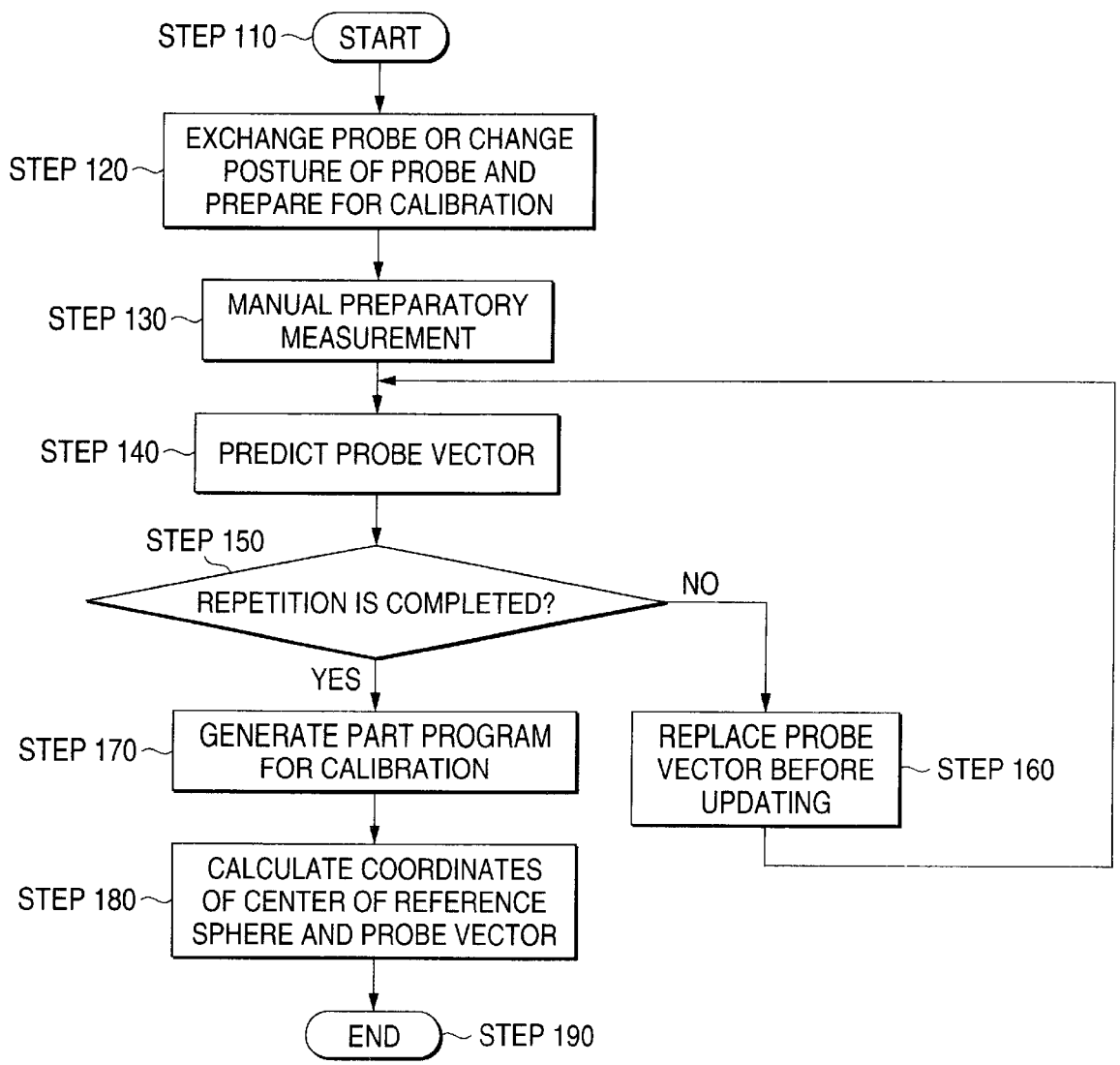
FIG. 2 is a flow chart showing a calibrating method according to a second embodiment of the invention.

FIG. 2 shows a method for calibrating a probe according to a second embodiment of the invention. The second embodiment is the same as the first embodiment except that step 150 is provided to make it possible to execute the step 40 in the first embodiment by a plurality of times, and except that step 160 of replacing the probe vector before updating is provided.

In the step 150, checking is repeated by a predetermined number of times. When the repetition is completed, step 170 is executed. When the repetition is not completed, the step 160 is executed and then the step 140 is executed.

In the step 160, the probe vector P0 before updating is replaced by the predicted probe vector P1' calculated in the step 140 executed previously. When the step 140 is executed again after that, the probe vector P0 is replaced by the predicted probe vector P1'. Hence, the expression (3) is substantially executed as follows.

$$xi' = xi + f(xi, P1') \quad (6)$$

As described above, the step 140 is repeated unless the number of times of repetition reaches the predetermined number while the probe vector P0 before updating is replaced by the predicted probe vector P1' calculated previously. After the number of times of repetition reaches the predetermined number, the step 170 is executed.

The second embodiment shown in FIG. 2 has the following effect in addition to the effect (1) of the first embodiment.

(2) After the probe vector P0 before updating is replaced by the predicted probe vector P1' calculated previously, error compensation is performed by using the predicted probe vector P1'. Accuracy in error compensation is improved, so that accuracy of the predicted probe vector P1' calculated newly is improved.

Because calculation of the predicted probe vector is repeatedly executed as described above unless the number of times of repetition reaches the predetermined number, accuracy in calculation of the predicted probe vector P1' is improved more greatly. Because a calibration measurement part program is generated by using the predicted probe vector P1' improved in accuracy and executed to perform calibration measurement of the reference sphere, measurement of the reference sphere by the calibration measurement part program is further improved in accuracy. Accordingly, accuracy of the final probe vector P obtained on the basis of the result of the calibration measurement is improved more greatly.

Figure 3:
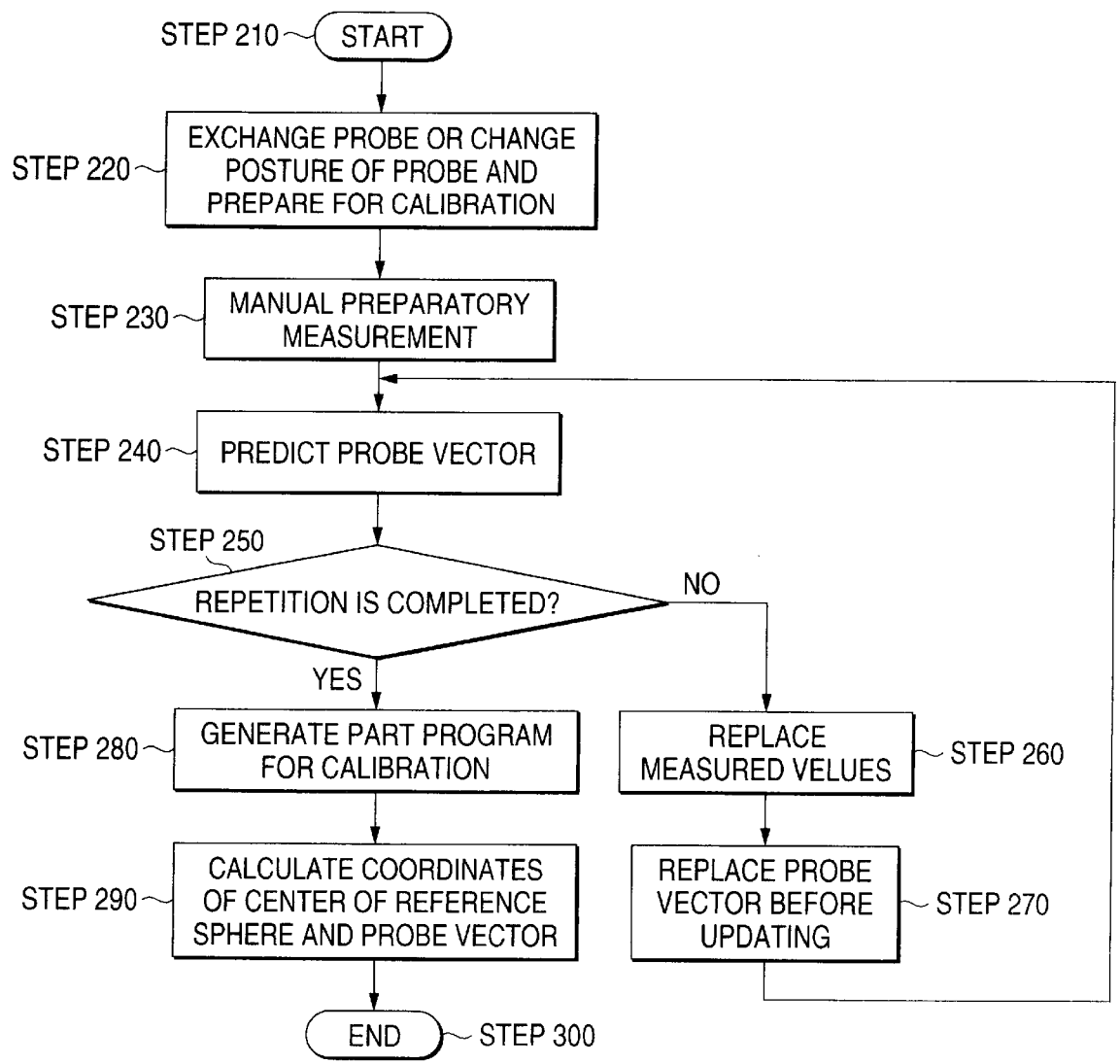
FIG. 3 is a flow chart showing a calibrating method according to a third embodiment of the invention.

Next, FIG. 3 shows a method for calibrating a probe according to a third embodiment of the invention.

The third embodiment is the same as the second embodiment except that step 260 is executed to replace the measured values xi before the step 160 in the second embodiment is executed.

In the step 260, the results xi' of error compensation transformation of the measured values calculated in step 240 executed previously are inversely transformed by the probe vector used in the error compensation transformation in the previous step 240 to thereby calculate new measured values xi". That is, the measured values xi are replaced by the new measured values x".

$$xi'' = xi' - f^{-1}(xi', P0) \quad (7)$$

Then, in step 270, the probe vector P0 before updating is replaced by the predicted probe vector P1' calculated in the step 240 executed previously. When the step 240 is executed again after that, the probe vector P0 is replaced by the predicted probe vector P1' and the measured values xi are also replaced by the new measured values xi". Hence, the expression (6) is substantially executed as follows.

$$xi' = xi'' + f(xi'', P1') \quad (8)$$

As described above, unless the number of times of repetition reaches the predetermined number, the step 240 is repeatedly executed while the probe vector P0 before updating and the measured values xi are replaced. After the number of times of repetition reaches the predetermined number, step 280 is executed. The third embodiment shown in FIG. 3 has the following effect in addition to the effects (1) and (2) of the previous embodiments.

(3) The probe vector P0 before updating is replaced by the predicted probe vector P1' calculated previously. The measured values xi are also replaced by the results xi" of error compensation inverse transformation. Then, error compensation is performed. Hence, accuracy in error compensation is improved, so that accuracy of the predicted probe vector P1' calculated newly is improved more greatly.

Because calculation of the predicted probe vector is repeatedly executed unless the number of times of repetition reaches the predetermined number, accuracy in calculation of the predicted probe vector P1' is improved more greatly. Because a calibration measurement part program is generated by using the predicted probe vector P1' improved in accuracy and executed to perform calibration measurement of the reference sphere, accuracy in measurement of the reference sphere by the calibration measurement part program is improved more greatly. Hence, accuracy of the final probe vector P obtained on the basis of the result of the calibration measurement is improved more greatly.

Although preferred embodiments of the invention have been described above, the invention is not limited to these embodiments and changes may be made without departing from the gist of the invention.

For example, although the respective embodiments have been described upon the case where a contact type probe is used, the invention may be also applied to the case where a CCD camera, an image sensor or a capacitance-operated or electromagnetic induction non-contact type probe is used. The probe may be a touch signal probe or a scanning probe. Although description has been made upon the case where the calibration reference work is limited to a reference sphere, the invention may be also applied to the case where an accurately processed gauge block or the like is used as the calibration reference work.

Although description has been made upon the case where a coordinate measuring machine is used as the measuring machine, high-accuracy calibration can be performed by the invention when the invention is applied to a probe used in the other measuring machine such as a contour measuring machine, a roundness measuring machine or an vision measuring machine.

Further, these probe calibrating methods may be provided as a calibration program to be executed by a computer. The calibration program can be stored in portable recording media such as CD-ROM so that the calibration program can be executed by various kinds of computers. The calibration program may be translated into a machine language in the complied form or may be translated into an intermediate language in the interpreter form.

Further, the calibration program can be executed by the computer 270 to thereby form a probe calibrating machine. That is, each of the steps 20, 120 and 220 in FIGS. 1 to 3 can form a calibration condition input unit, each of the steps 30, 130 and 230 can form a preparatory measurement data input unit, each of the steps 40, 140 and 240 can form a predicted probe vector calculation unit, each of the steps 50, 170 and 280 can form a calibration measurement part program generating unit, each of the steps 60, 180 and 290 can form a probe vector calculation unit, each of the steps 150 and 250 can form a repetition judgment unit, each of the steps 160 and 270 can form a not-yet-updated probe vector replacing unit, and the step 260 can form a measured value replacing unit.

As described above, in accordance with the invention, the probe vector can be calibrated with high accuracy.

What is claimed is:

1. A method of calibrating a probe by calibrating a probe vector indicating an offset of a measurer of said probe, comprising:

a step of updating said probe measuring a work by exchanging said probe or by changing a posture of said probe;

a preparatory measuring step of measuring a calibration reference work by using a probe vector before updating to thereby obtain measured values;

a probe vector predicting step of predicting a probe vector on the basis of a result of error compensation transformation using said measured values obtained by the preparatory measuring step and said probe vector given before updating of said probe;

a calibration measuring step of generating a part program for measuring said calibration reference work by using said predicted probe vector and executing said part program; and a probe vector calibrating step of calculating a calibration value of said probe vector on the basis of results measured by the calibration measuring step.

2. The method for calibrating a probe according to claim 1, wherein said calibration reference work is a sphere.

3. A computer-readable medium for a scanning probe through which a method for calibrating a probe according to claim 1 is executed by a computer.

4. The method for calibrating a probe according to claim 1, further comprising:

a repetition judging step of judging whether said probe vector predicting step is to be repeatedly executed or not; and a step of replacing said probe vector before updating by said probe vector predicted by the previous probe vector predicting step and executing the probe vector predicting step when a decision is made in the repetition judging step that a number of times of repetition is smaller than a predetermined number.

5. The method for calibrating a probe according to claim 4, further comprising:

a step of performing error compensation inverse transformation of a result of said error compensation transformation in the previous probe vector predicting step by said probe vector before both replacement and updating and replacing said measured values by results of said error compensation inverse transformation when a decision is made in said repetition judging step that the number of times of repetition is smaller than a predetermined number.

* * * * *